Figures 1, 2, 3:
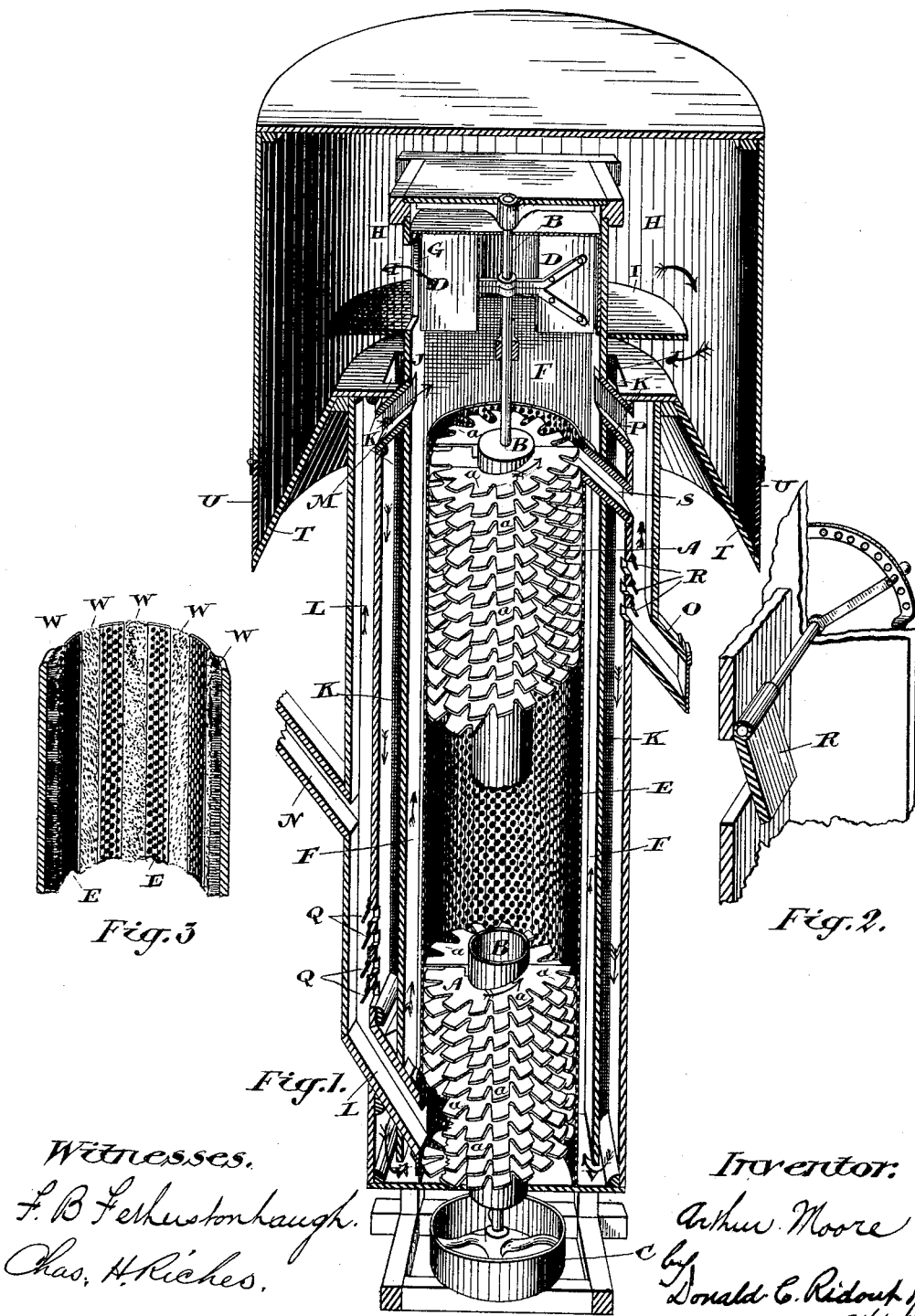

(No Model.)

A. MOORE.
GRAIN SCOURER.

No. 406,931. Patented July 16, 1889.

Witnesses.
F. B. Fetherstonhaugh.
Chas. H. Riches.

Inventor:
Arthur Moore
by
Donald C. Ridout &Co
att'y

UNITED STATES PATENT OFFICE.

ARTHUR MOORE, OF TORONTO, ONTARIO, CANADA.

GRAIN-SCOURER.

SPECIFICATION forming part of Letters Patent No. 406,931, dated July 16, 1889.

Application filed December 1, 1888. Serial No. 292,402. (No model.)

*To all whom it may concern:*

Be it known that I, ARTHUR MOORE, merchant miller, of the city of Toronto, in the county of York, in the Province of Ontario, Canada, have invented a certain new and Improved Grain Scourer and Cleaner, of which the following is a specification.

The object of the invention is to design a simple and light-running machine for scouring and cleaning grain; and it consists, essentially, of a peculiarly-constructed revolving conveyer located within a perforated cylinder surrounded by a chamber containing a suction-fan situated at the upper end of the conveyer, the chamber containing the fan being arranged to communicate with other chambers in such a manner that the dust and impurities from the grain shall be drawn out and discharged while a complete circulation is maintained through the machine substantially in the manner hereinafter more particularly explained.

In the drawings, Figure 1 is a perspective sectional elevation of my improved scourer and cleaner. Fig. 2 is a perspective detail of the air-regulating valves for regulating the passage of the air between the chambers having an upward draft and the chambers having a downward draft. Fig. 3 is a detail showing the plan of connecting a brush to the perforated cylinder.

A represents a conveyer, formed of any suitable material and connected to a shaft B, preferably made large in diameter and hollow where the conveyer is connected to it. This shaft B is supported in suitable bearings in a vertical position, and on the bottom end of the shaft a driving-pulley C is fixed, while on its upper end a fan D is attached.

E is a perforated cylinder fixed within the inner chamber F and designed to contain the conveyer A. The suction-fan D is situated within the chamber F immediately above the perforated cylinder E. An opening G is made in the wall of the chamber F immediately opposite to the fan D. The fan D is formed so that when it revolves an upward draft is created in the chamber F and discharges through the opening G into the blast-chamber H. A shelf I is placed immediately below each opening G and projects into the chamber H, so as to protect the openings J, which form a communication between the chamber H and the chamber K which surrounds the chamber F.

L is an air-leg. The upper end of this leg is connected by the passage-ways M with the inner chamber F, and its lower end is shaped so as to extend through the walls of the chambers K and F into the perforated cylinder E.

N is the grain-spout connecting with the air-leg L, and O is the discharge-spout communicating with the chamber F through the passage-way P.

Q represents the valves for regulating the passage of the air from the chamber K into the air-leg L, and R are the valves for regulating the passage of the air from the chamber K into the discharge-spout O.

Having now referred to the mechanical parts involved in my invention, I shall proceed to briefly describe the operation of the machine. Before doing so I beg to draw attention to the fact that my machine is vertical, and it will be noticed, as I proceed with the description, that the grain which enters the bottom of the machine is elevated by the conveyer and is discharged from the top of the machine, thereby obviating the necessity of using elevators for elevating the grain after it has been scoured and cleaned. The grain which enters through the grain-spout N into the air-leg L falls and enters the bottom end of the perforated cylinder E, and as the conveyer A revolves in the direction indicated by arrow within the said perforated cylinder E the grain, falling into the bottom end of the revolving conveyer A, is elevated to its top, and is discharged through the passage-way S into the discharge-spout O. It will be noticed that the outer edge of the conveyer A is cut or shaped to form a series of fingers *a*, each finger being slightly curved, so that one edge of each finger shall be above the edge of the finger next to it. This shape of conveyer in revolving acts against the grain, so as to roll each kernel, and thus by thoroughly agitating the grain insures its perfect scouring.

Owing to the motion of the fan D and the arrangement of the passage-ways between the chambers, as herein described, an upward draft is produced within the chamber F, air-leg L, and discharge-spout O, while a downward blast is created through the chamber K and a side blast within the chamber H. The passage-ways or openings between the chambers, air-leg, and spout insure a complete circulation of a draft within the machine. The upward draft in the air-leg L raises the dust and light refuse from the grain as it enters the leg L, and the said dust is discharged into the chamber H, where it falls on the slanting bottom T of the said chamber, and the upward draft in the chamber F raises the dust and cleanings shaken from the grain during the period that it is being elevated by the conveyer A, and discharges the said dust and cleanings into the chamber H, where they fall by their own gravity onto the bottom T of the said chamber, from which they are withdrawn through the doors U. The openings J permit the air blown into the chamber H to find an escape through the chamber K and through an opening V at the bottom of the said chamber back into the chamber F, thus maintaining the desired circulation.

With the view of maintaining the necessary circulation through the air-leg L and discharge-spout O, I make openings between them and the air-chamber K, placing valves Q and R on the said openings, so that the strength of the draft may be regulated by the miller.

Instead of making the cylinder E entirely of perforated metal, I sometimes introduce a series of brushes W, (see Fig. 3,) at such points as may be desired. It will be observed that the shelves I prevent the dust and cleanings from falling into the chamber K, and it will further be observed that the grain entering the bottom of the machine is more thoroughly separated and therefore better cleaned than it would be were it to be entered at the top of the machine, as of course my revolving elevating-conveyer works against gravitation, whereas if the grain entered at its top it would be working with gravitation, and would therefore have a tendency to compress the grain rather than separate it, as it now does.

By making the shaft B hollow I secure a large surface for connecting the conveyer to the shaft, and obtain additional strength without materially increasing the weight.

In referring to the conveyer as vertical I do not wish to imply that it must be exactly perpendicular.

What I claim as my invention is—

1. A vertical conveyer revolving within a perforated cylinder, in combination with a chamber surrounding said cylinder, an air-leg communicating with the said chamber at its upper end and with the cylinder at its lower end, and passage-ways designed to spout the grain into the bottom of the conveyer and to discharge it out of the top of the cylinder, substantially as and for the purpose specified.

2. A conveyer revolving within a perforated cylinder and having its outer edge formed into a series of fingers, each finger being curved or bent, so that one edge shall project slightly above the edge of the finger next to it, in combination with a chamber surrounding said cylinder, an air-leg communicating with the said chamber at its upper end and with the cylinder at its lower end, and passage-ways designed to spout the grain into one end of the conveyer and to discharge it out of the other end, substantially as and for the purpose specified.

3. A vertical conveyer revolving within a perforated cylinder and having its outer edge formed into a series of fingers, each finger being curved or bent, so that one edge shall project slightly above the edge of the finger next to it, in combination with a chamber surrounding said cylinder, an air-leg communicating with the said chamber at its upper end and with the cylinder at its lower end, and passage-ways designed to spout the grain into the bottom of the conveyer and to discharge it out of the top of the conveyer, substantially as and for the purpose specified.

4. A vertical conveyer revolving within a perforated cylinder and having its outer edge formed into a series of fingers, each finger being curved or bent, so that one edge shall project slightly above the edge of the finger next to it, in combination with a chamber surrounding said cylinder, an air-leg communicating with the said chamber at its upper end and with the cylinder at its lower end, and passage-ways designed to convey the grain into the bottom of the conveyer and to discharge it out of the top of the conveyer, and with a suction-fan located above the conveyer, substantially as and for the purpose specified.

5. A vertical conveyer revolving within a perforated cylinder contained within a chamber, a revolving suction-fan contained within the said chamber, in which it is designed to produce an upward draft and an outward blast through the sides of the said chamber, in combination with passage-ways designed to spout the grain into the bottom of the conveyer and to discharge it out of the top of the conveyer, and adjustable valves for regulating the passage of air into and from said chamber, substantially as and for the purpose specified.

6. A hollow shaft, a vertical conveyer carried by said shaft and revolving within a perforated cylinder contained within a chamber, the edges of the said conveyer being formed into a series of fingers, each finger being curved or bent so that one edge shall project slightly above the edge of the finger next to it, a revolving suction-fan contained within the said chamber, in which it is designed to produce an upward draft and an outward blast through the sides of the said chamber, in combination with passage-ways designed to spout the grain into the bottom of the conveyer and to discharge it out of the top of the conveyer, substantially as and for the purpose specified.

7. A vertical conveyer revolving within a perforated cylinder contained within a chamber, a revolving suction-fan contained within the said chamber, in which it is designed to produce an upward draft and an outward blast through the sides of the said chamber into the chamber H, communicating with the chamber K, connected to the chamber containing the conveyer at or near its bottom end, shelves projecting over the openings between the chamber H and chamber K being provided, in combination with passage-ways designed to spout the grain into the bottom of the conveyer and to discharge it out of the top of the conveyer, substantially as and for the purpose specified.

8. A vertical conveyer revolving within a perforated cylinder contained within a chamber, a revolving suction-fan contained within the said chamber, in which it is designed to produce an upward draft and an outward blast through the sides of the said chamber into the chamber H, communicating with the chamber K, connected to the chamber containing the conveyer at or near its bottom end, shelves projecting over the openings between the chamber H and chamber K being provided, in combination with said chambers H and K, the air-leg L, connected at its upper end with the chamber containing the suction-fan and at its bottom end with the interior of the perforated cylinder at or near the bottom end of the revolving conveyer, a grain-spout being connected to the said air-leg near its bottom, and a discharge-spout communicating with the interior of the perforated cylinder at the top of the conveyer, substantially as and for the purpose specified.

9. A vertical conveyer revolving within a perforated cylinder having a series of brushes arranged in it, said perforated cylinder being contained within a chamber, a revolving suction-fan contained within the said chamber, in which it is designed to produce an upward draft and an outward blast through the sides of the said chamber into the chamber H, arranged to communicate with the chamber K, connected to the chamber containing the conveyer at or near its bottom end, in combination with the air-leg L, connected at its upper end with the chamber containing the suction-fan and at its bottom end with the interior of the perforated cylinder at or near the bottom end of the revolving conveyer, a grain-spout being connected to the said air-leg near its bottom, and a discharge-spout communicating with the interior of the perforated cylinder at the top of the conveyer, substantially as and for the purpose specified.

10. A vertical conveyer revolving within a perforated cylinder having a series of brushes arranged in it, said perforated cylinder being contained within a chamber, a revolving suction-fan contained within the said chamber, in which it is designed to produce an upward draft and an outward blast through the sides of the said chamber into the chamber H, communicating with the chamber K, connected to the chamber containing the conveyer at or near its bottom end, in combination with an air-leg L, connected at its upper end with the chamber containing the suction-fan and at its bottom end with the interior of the perforated cylinder at or near the bottom end of the revolving conveyer, a grain-spout being connected to the said air-leg near its bottom and above one or more air-regulating valves placed on an opening or openings connecting the air-leg with the chamber K, and a discharge-spout communicating with the interior of the perforated cylinder at the top of the conveyer, substantially as and for the purpose specified.

11. A vertical conveyer revolving within a perforated cylinder having a series of brushes arranged in it, said perforated cylinder being contained within a chamber, a revolving suction-fan contained within the said chamber, in which it is designed to produce an upward draft and an outward blast through the sides of the said chamber into the chamber H, communicating with the chamber K, connected to the chamber containing the conveyer at or near its bottom end, in combination with the air-leg L, connected at its upper end with the chamber containing the suction-fan and at its bottom end with the interior of the perforated cylinder at or near the bottom end of the revolving conveyer, a grain-spout being connected to the said air-leg near its bottom and above one or more air-regulating valves placed on an opening or openings connecting the air-leg with the chamber K, and a discharge-spout communicating with the interior of the perforated cylinder at the top of the conveyer and with the interior of the chamber containing the suction-fans, regulating air valve or valves being placed on an opening or openings made between the discharge-spout and chamber K, below the passage-way leading between the said discharge-spout and the interior of the perforated cylinder, substantially as and for the purpose specified.

Toronto, November 23, 1888.

ARTHUR MOORE.

In presence of—
CHARLES C. BALDWIN,
CHAS. H. RICHES.